Nov. 15, 1932.   LE ROY H. HOFFER   1,887,488
WELDING APPARATUS AND METHOD
Filed June 18, 1929
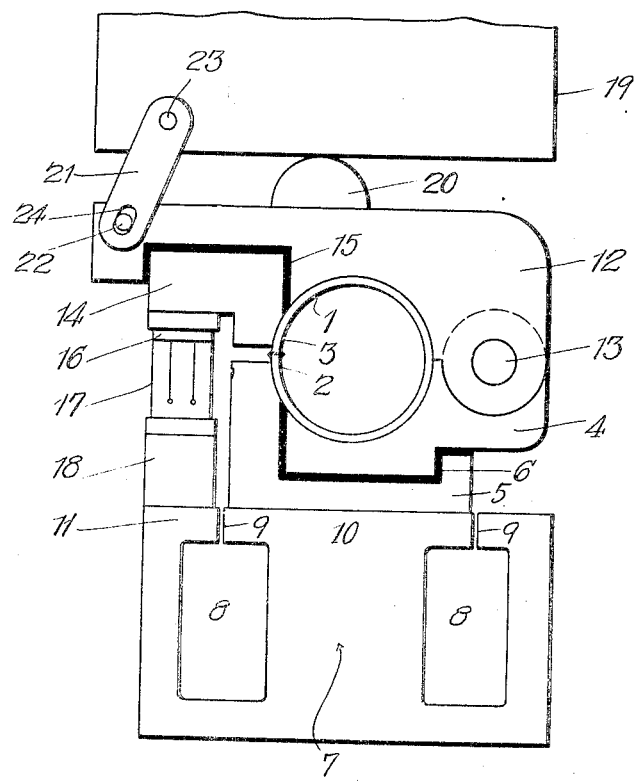
Inventor
LeROY H. HOFFER.
By his Attorneys
Usina & Rauber Patented Nov. 15, 1932

1,887,488

UNITED STATES PATENT OFFICE

LE ROY H. HOFFER, OF BROOKLYN, NEW YORK, ASSIGNOR TO METROPOLITAN ENGINEERING COMPANY, OF BROOKLYN, NEW YORK, A CORPORATION OF NEW YORK

WELDING APPARATUS AND METHOD

Application filed June 18, 1929. Serial No. 371,755.

My invention relates to apparatus and methods for electric butt welding hollow articles and more particularly for electrically butt welding the longitudinal seams of elongated hollow articles such as pipes, tubes, etc.

An object of the invention is to provide a machine for welding articles of the above indicated type on a longitudinal seam in which the hollow article is supported throughout its circumference or periphery, and in which the welding current is applied only at, or in close proximity to, the seam being welded.

Another object of the invention is to provide a method of electrically butt welding hollow articles in which the main body of the article is almost entirely outside of the induced electric and magnetic circuits, and in which the electric welding current takes the shortest possible path to the edges to be welded.

Other features and objects of the invention are to provide a welding apparatus for elongated hollow articles in which the article to be welded may be easily placed in and removed from the apparatus; in which the position of the article and of the seam to be welded are visible and accessible while being placed in the apparatus and throughout the welding operation; and to provide a simple and effective means for the application of pressure during the welding operation, and for freeing the forms and electrodes from the article upon the completion of the welding.

With these and other objects in view which will appear more in detail in the following description, the invention comprises the apparatus described in the following specification and claims.

The various features of the invention are illustrated in the accompanying drawing which is a side elevation of apparatus embodying a preferred form of the invention.

In the embodiment of my invention shown in the accompanying drawing an elongated, tubular sheet of metal 1 having abutting longitudinal edges 2 and 3 is placed in a lower fixed form having a semi-cylindrical recess to receive it. The form 4 is supported on an electrode 5 which underlies the form 4 and is insulated therefrom by a layer of insulation 6. The front portion of the electrode 5 extends upwardly at the front edge of the form 4 and contacts directly with the sheet 1 immediately beneath the lower abutting edge 2. The electrode 5 is supported upon a base 7 which forms the secondary of a step down transformer having an annular recess 8 for the primary transformer winding, and a slot 9 extending upwardly therefrom to divide the base into a central pole or terminal 10, on which the lower electrode 5 rests, and a pair of outer terminals 11. The upper part of the sheet 1 is enclosed within a movable form 12 hinged or fulcrumed at its rear edge on the lower form 4 by a hinge 13. An electrode 14 is mounted at the front edge of the movable form 12 to complete the semi-cylindrical contour of the form and to contact directly with the sheet 1 immediately adjacent the longitudinal edge 3. The electrode 14 is separated from the form 12 by means of a layer of insulation 15.

Through this construction the cylindrical sheet 1 is supported throughout its entire circumference by the forms 4 and 12 and the front portions of the electrodes 5 and 14. The electrodes are so insulated that but a short part of the periphery of the metal sheet is in direct contact therewith so that when the forms are closed, bringing the electrodes into close proximity, and the electrodes are connected in an electric circuit between the secondary terminals 10 and 11, the path of the current from the electrodes directly through the abutting edges 2 and 3 is extremely short as compared with the path around the circumference of the sheet.

The lower electrode 5 is at all times in electrical contact with the central pole or terminal of the secondary 7. The movable electrode 14 is disconnected from the other terminal 11 when the form 12 is raised to open position but, when lowered, the contact blades 16 on the front edge of the electrode 14 engage and contact with contact blades 17 mounted on a filling or supporting block 18 supported on and directly connected to the outer terminal or pole 11 so that, when the forms are closed, the electrodes 5 and 14 are automatically and instantly connected into a circuit through the low potential, large current secondaries of the step down transformer. When the movable form 12 and electrode 14 have been lowered in position to engage the circumference of the sheet 1 and to connect the electrode 14 to the terminal 11, pressure is applied to the form 12 and electrode 14 to cause the necessary take-up of metal in forming a seam between the edges 2 and 3.

This pressure is applied from a downwardly moving head 19 through a rounded knob 20 on the upper surface of the form 12, this rounded surface of the knob providing a uniform application of pressure in all positions of the form as it swings on the hinge 13. When the head 19 is lifted it lifts the form 12 by means of a link 21 secured by a pin 22 to the form 12 near its front edge, and by a pin 23 to the lower part of the head 19. The pin 22 works in a longitudinal slot 24 in the lower end of the link 21 to permit the head 19 to begin its upper movement and gain some momentum before this movement is applied to the form 12, thereby applying an upper stroke or blow to the latter and thus serving to free it from the outer surface of the completed article 1, in the event that the electrode 14 should stick to the latter. The securing of the link to the part of the form 12 farthest from the hinge 13 also provides a maximum leverage for the opening movement.

It will be apparent that in using the above apparatus the rounded or cylindrically shaped sheet 1 may be readily laid in the semi-cylindrical depression in the form 4 with the abutting edges 2 and 3 exposed so that they may be accurately positioned.

It will be noted that in welding with the above apparatus, the electric current takes the shortest possible path through the edges to be welded and that magnetic cross currents around the circumference of the pipe are avoided. The main body of the pipe is placed almost entirely outside the magnetic and electric circuits.

When the upper form 12 has been lifted to its open position, maximum accessibility is provided for the removal of the welded article and its replacement by a new sheet to be welded.

What I claim is:

1. Apparatus of the type described which comprises a secondary for generating a low potential current, a fixed electrode of narrow width mounted on and connected to one terminal of said secondary, a fixed form insulated from said secondary and forming with said fixed electrode a fixed form section, and a movable form section complementary to said fixed section and having a narrow electrode spaced from said fixed electrode when said movable electrode is brought to closed position, said narrow electrode being insulated from said movable form section and means making an electrical connection between said narrow electrode of said movable form section and a terminal of said secondary upon closing.

2. A welding apparatus which comprises a pair of complementary form sections, means for movable mounting said sections to move to open and closed positions, a pair of electrodes placed in opposed edges of said form sections and insulated from the sections, and means for connecting said electrodes in an electric welding current as said sections are brought to closed position.

3. A welding apparatus which comprises a pair of complementary form sections hinged to each other, electrodes at the edges of said sections opposite their hinged connection and insulated from the remainder of said sections, and means for connecting said electrodes in an electric welding circuit as said sections are closed.

4. Electric butt welding apparatus which comprises a horizontal electrode, a fixed article supporting and forming section mounted and supported on, and insulated from, said electrode, a movable supporting and forming section fulcrumed on said fixed section, and an electrode mounted on and insulated from said movable section to swing downwardly to closed position in position to be brought closely adjacent said fixed electrode when said sections are closed and means to connect said electrodes in an electric circuit when said sections are closed.

5. Electric butt welding apparatus which comprises an electrode, a fixed article supporting and forming section mounted on and insulated from said electrode, a movable supporting and forming section fulcrumed on said fixed section, an electrode mounted on and insulated from said movable section in position to be brought closely adjacent said fixed electrode when said sections are closed, and means for connecting said electrode in an electric circuit when said sections are closed.

6. Electric butt welding apparatus which comprises a fixed form, a complementary movable form hinged to said fixed form, a pair of electrodes one for each form at and insulated from the free edges of said forms, a movable head, a pressure applying block between said head and said movable form and means connecting said movable electrode to said head to permit a slight relative movement therebetween.

7. Electric butt welding apparatus which comprises a fixed form, a complementary movable form hinged to said fixed form, a pair of electrodes one for each form at and insulated from the free edges of said forms, a movable pressure head, a pressure applying block between said head and said movable form, and a form separating link between said head and said movable electrode, said link having a slot connection between said head and said movable electrode.

8. Electric butt welding apparatus which comprises a fixed form, a complementary movable form hinged to said fixed form, a pair of electrodes one for each form at and insulated from the free edges of said form, a movable head, a pressure applying block between said head and said movable form, a form separating link between said head and said movable electrode, a secondary electric circuit connected at one terminal to said fixed electrode, and means for connecting the other terminal to the movable electrode upon closing said forms.

In witness whereof, I have hereunto signed my name.

LE ROY H. HOFFER.